2,564,155

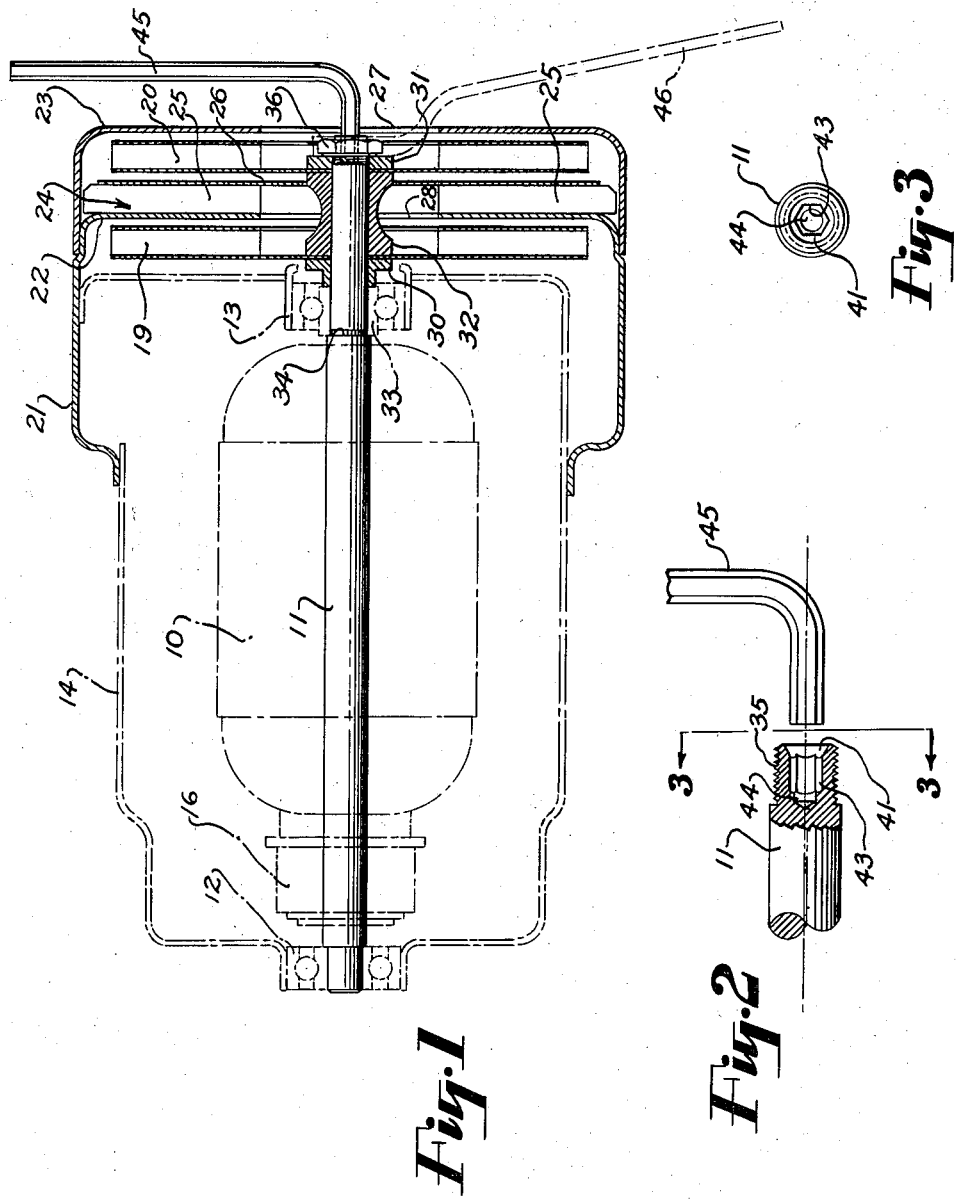
Aug. 14, 1951 — F. Z. DAUGHERTY — 2,564,155
ELECTRIC MOTOR DRIVEN FAN STRUCTURE
Filed Feb. 8, 1947
INVENTOR.
FRANK Z. DAUGHERTY
BY Fay, Golrick & Fay
ATTORNEYS Patented Aug. 14, 1951

UNITED STATES PATENT OFFICE 2,564,155

ELECTRIC MOTOR-DRIVEN FAN STRUCTURE

Frank Z. Daugherty, Kent, Ohio, assignor to The Lamb Electric Company, Kent, Ohio, a corporation of Ohio Application February 8, 1947, Serial No. 727,416

1 Claim. (Cl. 230—130)

The present invention relates to an electric motor driven fan unit for a suction type cleaner, and it is particularly directed to structure by which the position of a fan element mounted on the drive shaft of the unit may be readily and accurately adjusted to balance the shaft.

Electric motor driven fans for vacuum cleaners generally have two fan blades mounted on the armature shaft of the motor and the motor rotates at a high speed, such as 10,000 R. P. M. It is essential, therefore, that the shaft, together with the fan blades, is balanced so that the center of mass is at the axis of the shaft, otherwise undesirable vibrations will occur which are detrimental to the mechanism. Since it is not feasible to produce fan blades on a commercial basis that are identical in mass, it is the practice to adjust the angular position of one fan blade relative to the other on the shaft, and by trial, to thus bring about a balanced condition of the shaft. The locking of the fan blades in their adjusted positions is generally effected by threading a lock nut on one end of the armature shaft and providing a shoulder on the shaft whereby the hubs of the fan blades are compressed between the shoulder and lock nut and frictionally held in the desired angular position, usually arrived at after a number of trial operations. During the assembly of the fan unit, in order to tighten the lock nut on the armature shaft, it is necessary to hold the armature shaft from rotating and to rotate the locking nut on the shaft. To facilitate the final assembly, it has been attempted to slot the end of the shaft for the reception of a screw driver so that the shaft could be prevented from rotating by a screw driver held in one hand of the operator while the lock nut was turned by a wrench held in the other hand. This arrangement required the use of a fixture to hold the casing, and, also, the angular position of the shaft relative to the casing could not be maintained with the degree of accuracy to discern the changes in position of the fan blade necessary to rapid balancing of the shaft. The use of the screw driver would scuff the centering recess in the end of the shaft, thereby reducing its effectiveness for centering the shaft.

An object of the present invention, therefore, is to provide a method and structure by which the armature shaft of the fan unit can be held by one hand of the assembler to prevent rotation thereof while the fan blades are locked or unlocked from the shaft by rotation of the lock nut on the shaft by use of the other hand of the operator.

Other objects and advantages of the invention will be apparent from the following description of a preferred form of the invention, reference being made to the accompanying drawings wherein:

Fig. 1 is a longitudinal view, partly in section, of an electric motor driven fan unit for a vacuum sweeper;

Fig. 2 is a fragmentary view, partly in section, of one end of the armature shaft of the motor shown in Fig. 1, and a wrench for holding the shaft against rotation; and, Fig. 3 is an end view of the shaft shown in Fig. 2, the view being taken along line 3—3 of Fig. 2.

In order to illustrate the invention, I have shown the fan unit of a vacuum suction cleaner. The structure of the cleaner mechanism for directing dust laden air into the cleaner and filtering the dust and dirt therefrom is not shown as such structures are well known. The fan unit includes an electric motor indicated at 10, which motor includes an armature shaft 11 that is journalled in roller bearings 12 and 13 which are supported by a housing 14, which housing also encloses the motor. The shaft 11 carries the armature and a commutator indicated at 16.

Two fan blades or assemblies 19 and 20 are mounted adjacent to one end of the shaft 11. The fan blade 19 is enclosed in a compartment formed by a wall structure having walls 21 and 22, and fan blade 20 is enclosed by an end cap-like member 23. A fixed air baffle member 24 is mounted to wall 22 and it includes a plurality of radially extending vanes 25 which join wall 22 and a disc shaped wall 26 to form radially extending air passages. The wall 26 extends short of the walls of the structure 23 to form an air passage between the walls of the latter structure and the periphery thereof. The structure 23 has a central opening 27 therein and wall 22 has an opening 28 for the passage of air into the housing 14. It will be understood that the suction created by operation of the fan blades may be utilized in the well known manner for suction cleaning.

The fan assemblies 19 and 20 are mounted on the shaft 11 so that they may rotate thereon, and spacers 30 and 31 are also rotatively mounted on the shaft 11 on the outside of the respective fan assemblies. These spacers may or may not be integral with the repective fan assemblies. A spacer 32 is mounted on the shaft 11 intermediate the fans 19 and 20. The end portions of the spacer 32 is preferably the same diameters as the diameters of the spacers 30 and 31, and the spacer need not be fixed to the shaft. The spacer 30 is adapted to abut the inner race 33 of the roller bearing 13, and the race 33 is adapted to abut a shoulder 34 formed on the shaft 11.

The end of shaft 11, on which the fan assemblies are mounted, is threaded as at 35 for receiving a lock nut 36. The spacer 31 overhangs the threads 35 so that the nut 36 may abut and press the spacer 31 toward the spacer 30, when nut 36 is rotated in the direction to move the nut toward the spacer. By turning the nut 36 in this direction, a frictional lock is thus formed between the spacer 31, spacer 32, spacer 30, race 33 and shoulder 34 for securing the fan assemblies in driving relation to the shaft and for fixing the blades angularly relative to one another. If desired, the spacer 30 could be secured to the shaft 11 against movement to the left, thereby forming a block against which the spacers and fan assemblies could be pressed without engaging with the bearing 13.

The ends of shaft 11 are recessed at opposite ends as shown at one end of the shaft at 41 for centering the shaft when it is desirable to repair or dress the commutator. The recesses are in the form of conical surfaces with the axes thereof coincident with the axis of the shaft. Thus, the commutator can be skinned or other work performed thereon in the usual type of turning machines, with the centering recesses establishing the center on which the shaft rotates.

In order to hold the shaft 11 against rotation during the tightening or loosening of the lock nut 36, a hexagonal socket or recess 43 is formed in the end of the shaft on which the lock nut 36 is threaded. The hexagonal socket 43 may be formed by drilling a hole 44 on the axis of the shaft and then milling or broaching the hole. It will be noted that the socket 43 enters the recess 41 at the inner end thereof so that the effectiveness of the recess 41 as a centering device is unimpaired. An "Allen" type wrench 45, formed of an L-shaped hexagonal stock is adapted to be received in the socket 43 and the wrench forms a handle extending at right angles to the shaft 11 and alongside the outside of the casing structure 23 so that the assembler of the unit can grasp the casing and hold the adjacent handle of the wrench simultaneously. Thus, when it is desirable to adjust the relative positions of the fan blades, the wrench 45 is inserted in socket 43 through the opening 27, and while holding the wrench and casing from rotation with one hand, a spanner type wrench 46 held in the other hand can be applied to lock nut 36 for loosening the latter. The fan blade 20 can then be shifted as desired and nut 36 tightened in the same manner as it was loosened. The radially extending handle of wrench 45 enables the shaft 11 to be held more firmly than it is possible with a screw driver in a slot in the end of the shaft, and the wrench handle will readily indicate the slightest change in angular position of the shaft during adjustment of the fan assembly. Also, the socket type wrench cannot scuff or injure the centering recess 41.

Thus, by my invention, the fan drive shaft of a fan unit can be balanced much more rapidly than formerly and this result is accomplished with a minimum of tools.

Although I have described but one form of the invention, it is to be understood that other forms might be adopted, all falling within the scope of the claim which follows.

I claim:

A high speed enclosed fan unit having an armature shaft with conic centering recesses in the ends thereof and a plurality of relatively adjustable fan elements on one end portion of the shaft surrounded by a casing having an air inlet opening adjacent said shaft end portion and said fan elements being relatively angularly adjustable on the shaft ends for dynamic balancing purposes, said armature shaft having the centering cone recess of the shaft end adjacent the opening extended inwardly to form a non-circular wrench socket and fan element clamping means threaded on the shaft end adjacent the casing opening and accessible through the opening for the application of a wrench thereto, whereby relative angular adjustment between the fan elements may be effected repeatedly to bring about dynamic balancing of the fan elements within the casing by the application of a wrench having a section complementary in cross sectional form to said non-circular part of the shaft socket and a second wrench to the clamping means.

FRANK Z. DAUGHERTY.

REFERENCES CITED

The following references are of record in the file of this patent:

UNITED STATES PATENTS

| Number | Name | Date |
|---|---|---|
| 1,681,881 | Shaw | Aug. 21, 1928 |
| 2,421,181 | Batchelder | May 27, 1947 |
| 2,422,860 | Seyfried | June 24, 1947 |

FOREIGN PATENTS

| Number | Country | Date |
|---|---|---|
| 513,497 | Great Britain | Oct. 13, 1939 |